US012664478B2

(12) United States Patent
Park et al.

(10) Patent No.: US 12,664,478 B2
(45) Date of Patent: Jun. 23, 2026

(54) REINFORCEMENT LEARNING WITH INFORMATION RETRIEVAL FEEDBACK

(71) Applicant: Google LLC, Mountain View, CA (US)

(72) Inventors: Hyun Jin Park, Palo Alto, CA (US); Dongseong Hwang, Kirkland, WA (US); Chang Wan Ryu, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 542 days.

(21) Appl. No.: 18/348,687

(22) Filed: Jul. 7, 2023

(65) Prior Publication Data

US 2025/0013915 A1 Jan. 9, 2025

(51) Int. Cl.
*G06N 20/00* (2019.01)

(52) U.S. Cl.
CPC .................................. *G06N 20/00* (2019.01)

(58) Field of Classification Search
CPC ...................................................... G06N 20/00
See application file for complete search history.

(56) References Cited

U.S. PATENT DOCUMENTS

| | | | | |
|---|---|---|---|---|
| 11,769,048 B2 * | 9/2023 | Agrawal | .............. | G06N 3/0499 706/25 |
| 11,983,553 B2 * | 5/2024 | Bent, III | ............... | G06F 40/166 |
| 12,060,082 B1 * | 8/2024 | Garimella | ....... | B60W 30/18159 |
| 12,062,227 B2 * | 8/2024 | Tan | ......................... | G06N 3/045 |
| 12,406,205 B2 * | 9/2025 | Ie | ............................ | G06N 5/043 |
| 12,434,725 B1 * | 10/2025 | Casterton | ............... | G06N 20/00 |
| 2023/0237494 A1 * | 7/2023 | Shachar | ............. | G06Q 30/0185 706/12 |
| 2023/0244938 A1 * | 8/2023 | Wei | ........................ | G06N 3/045 706/25 |
| 2023/0297852 A1 * | 9/2023 | Zhang | .................... | G06N 3/082 706/46 |

(Continued)

OTHER PUBLICATIONS

Kwon et al., "Reward Design with Language Models", arXiv:2303. 00001v1, Feb. 27, 2023, 18 pages.

(Continued)

*Primary Examiner* — Viral S Lakhia
(74) *Attorney, Agent, or Firm* — DORITY & MANNING, P.A.

(57) ABSTRACT

In one example aspect, the present disclosure provides an example computer-implemented method for generating feedback signals for training a machine-learned agent model. The example method can include obtaining an output of a machine-learned agent model, the output including a next state feature generated by the machine-learned agent model based on a sequence of preceding states. The example method can include processing, using a machine-learned reward model, the output and the sequence of preceding states to generate a quality indicator indicating a quality of the next state feature in view of the preceding states. The machine-learned reward model could be trained by retrieving reference data from a reference data source and computing one or more quality indicators in view of a respective training input and output(s), and the reference data. The example method can include outputting the quality indicator to a model trainer for updating the machine-learned agent model.

20 Claims, 10 Drawing Sheets

(56)        References Cited

U.S. PATENT DOCUMENTS

| | | | | |
|---|---|---|---|---|
| 2023/0394328 | A1* | 12/2023 | Wei | G06N 5/022 |
| 2024/0370487 | A1* | 11/2024 | Heiniger | G06F 16/538 |
| 2024/0378196 | A1* | 11/2024 | Lester | G06N 20/00 |

OTHER PUBLICATIONS

Nakano et al., "WebGPT: Browser-assisted question-answering with human feedback", arXiv:2112.09332v3, Jun. 1, 2022, 32 pages.

Openai.com, https://platform.openai.com/docs/plugins/introduction, Retrieved on Jul. 7, 2023, 3 pages.

Schick et al., "Toolformer: Language Models Can Teach Themselves to Use Tools". arXiv:2302.04761v1, Feb. 9, 2023, 17 pages.

Yao et al., "ReAct: Synergizing Reasoning and Acting in Language Models", arXiv:2210.03629v3, Mar. 10, 2023, 33 pages.

* cited by examiner

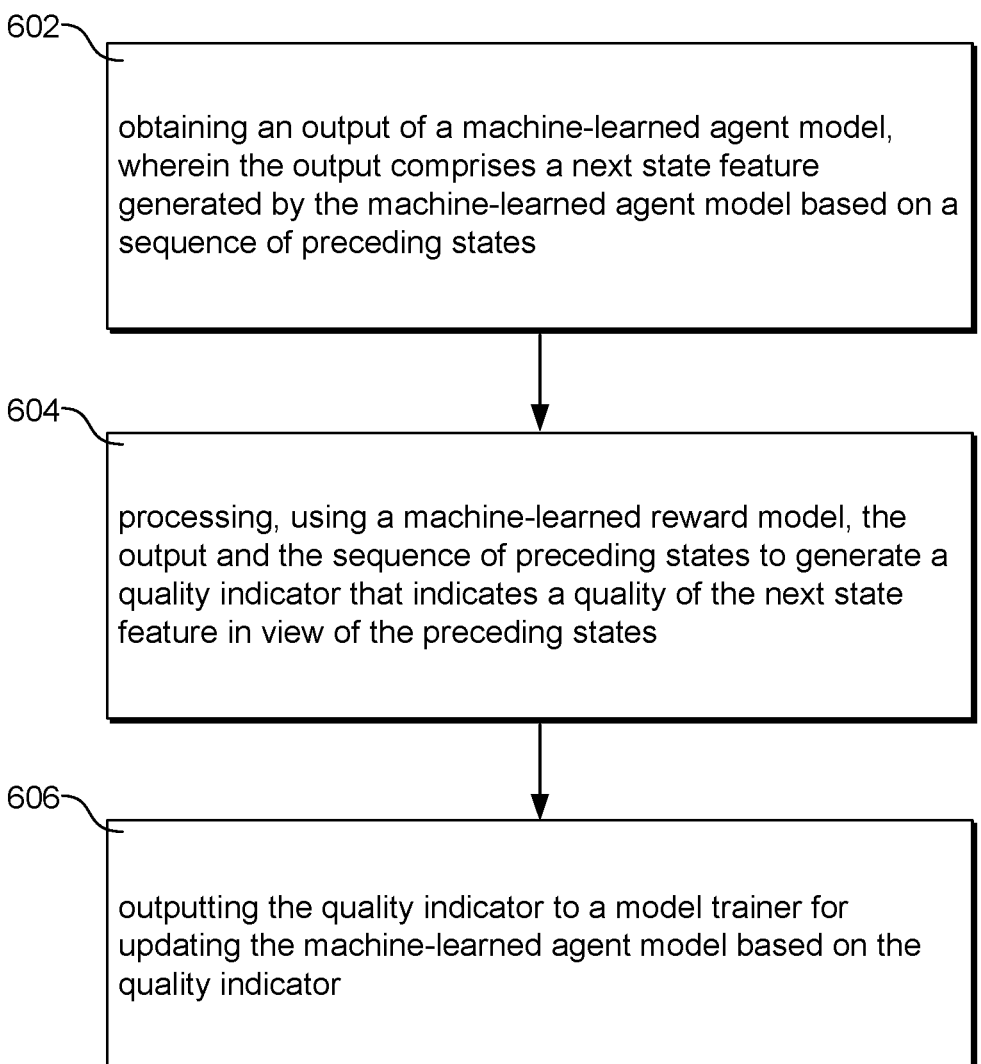

600

602 — obtaining an output of a machine-learned agent model, wherein the output comprises a next state feature generated by the machine-learned agent model based on a sequence of preceding states 604 — processing, using a machine-learned reward model, the output and the sequence of preceding states to generate a quality indicator that indicates a quality of the next state feature in view of the preceding states 606 — outputting the quality indicator to a model trainer for updating the machine-learned agent model based on the quality indicator

*FIG. 6*

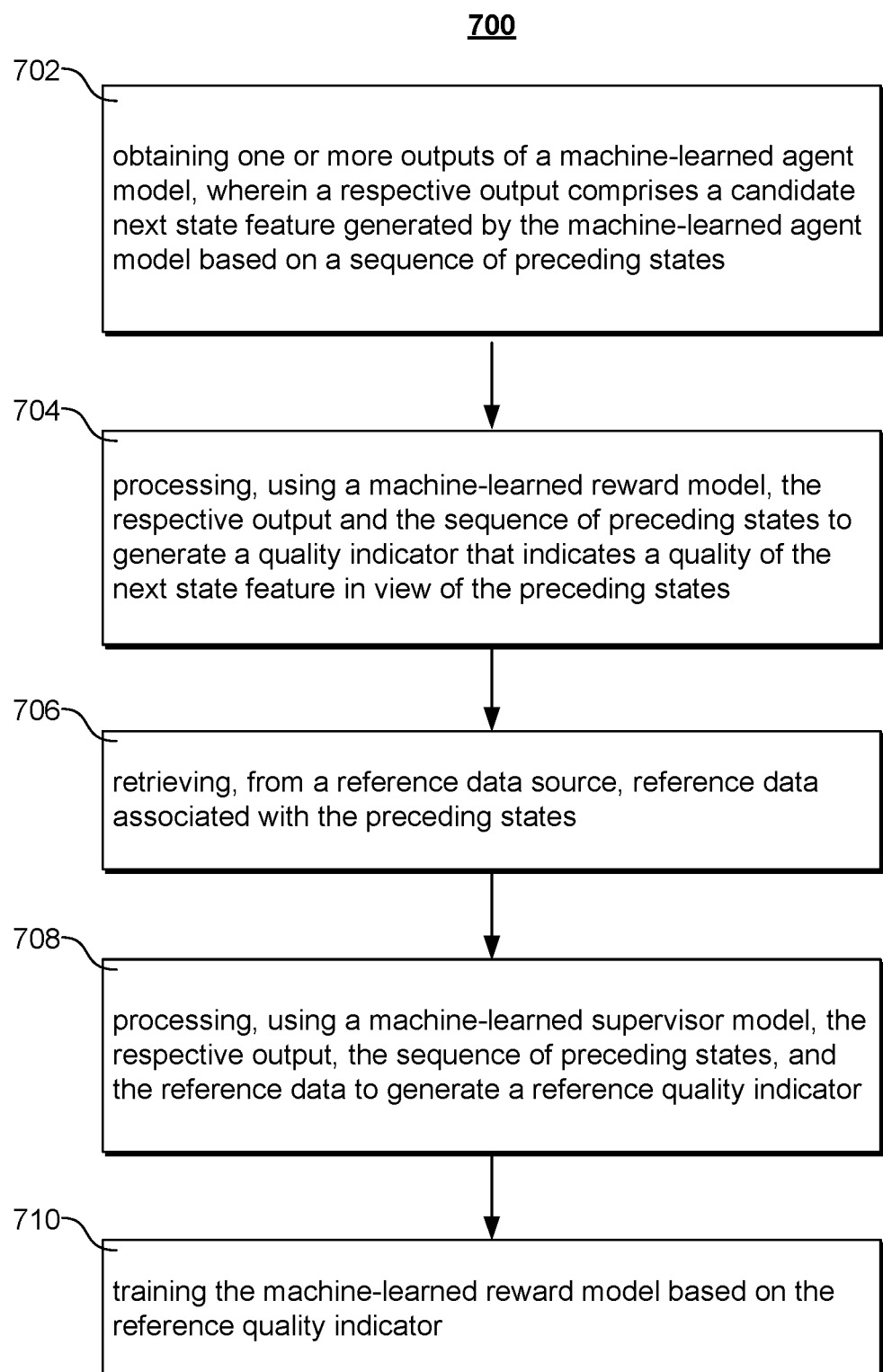

700

702 — obtaining one or more outputs of a machine-learned agent model, wherein a respective output comprises a candidate next state feature generated by the machine-learned agent model based on a sequence of preceding states 704 — processing, using a machine-learned reward model, the respective output and the sequence of preceding states to generate a quality indicator that indicates a quality of the next state feature in view of the preceding states 706 — retrieving, from a reference data source, reference data associated with the preceding states 708 — processing, using a machine-learned supervisor model, the respective output, the sequence of preceding states, and the reference data to generate a reference quality indicator 710 — training the machine-learned reward model based on the reference quality indicator

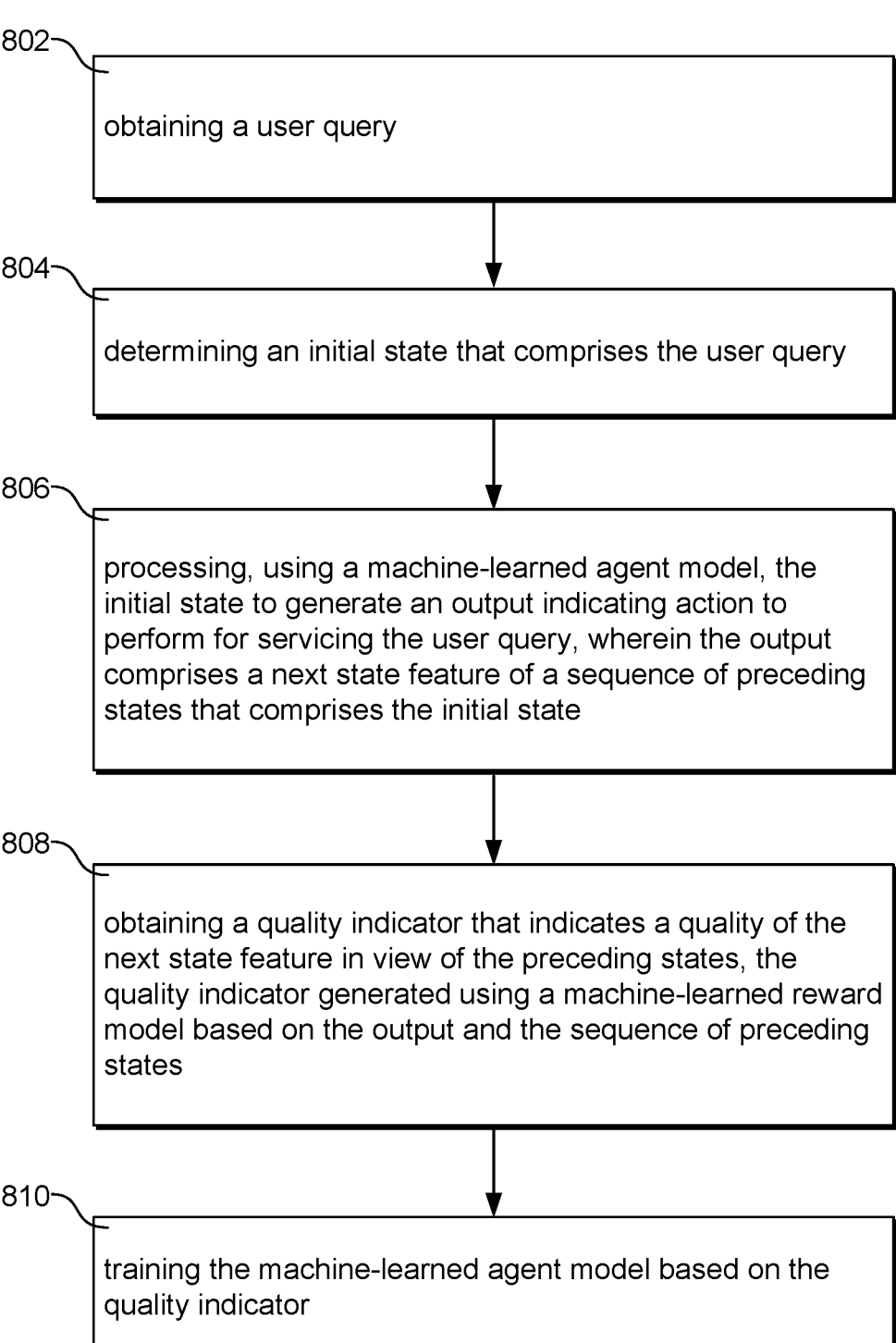

802 — obtaining a user query

804 — determining an initial state that comprises the user query

806 — processing, using a machine-learned agent model, the initial state to generate an output indicating action to perform for servicing the user query, wherein the output comprises a next state feature of a sequence of preceding states that comprises the initial state

808 — obtaining a quality indicator that indicates a quality of the next state feature in view of the preceding states, the quality indicator generated using a machine-learned reward model based on the output and the sequence of preceding states

810 — training the machine-learned agent model based on the quality indicator

*FIG. 8*

REINFORCEMENT LEARNING WITH INFORMATION RETRIEVAL FEEDBACK

FIELD

The present disclosure relates generally to machine learning. More particularly, the present disclosure relates to implementing machine-learned model to control external tools or services.

BACKGROUND

A computer can execute instructions to generate outputs provided some input(s) according to a parameterized model. The computer can use an evaluation metric to evaluate its performance in generating the output with the model. The computer can update the parameters of the model based on the evaluation metric to improve its performance. In this manner, the computer can iteratively "learn" to generate the desired outputs. The resulting model is often referred to as a machine-learned model.

SUMMARY

Aspects and advantages of embodiments of the present disclosure will be set forth in part in the following description, or can be learned from the description, or can be learned through practice of the embodiments.

In one example aspect, the present disclosure provides an example computer-implemented method for generating feedback signals for training a machine-learned agent model. The example method can include obtaining, by a computing system having one or more processors, an output of a machine-learned agent model. In the example method, the output can include a next state feature generated by the machine-learned agent model based on a sequence of preceding states. The example method can include processing, by the computing system and using a machine-learned reward model, the output and the sequence of preceding states to generate a quality indicator that indicates a quality of the next state feature in view of the preceding states. In the example method, the machine-learned reward model was trained by, for a respective training input and one or more respective training outputs, retrieving reference data from a reference data source and computing one or more quality indicators in view of the respective training input, the one or more respective training outputs, and the reference data. The example method can include outputting, by the computing system, the quality indicator to a model trainer for updating the machine-learned agent model based on the quality indicator.

In one example aspect, the present disclosure provides an example computing system having one or more processors and one or more non-transitory computer-readable media storing instructions that are executable by the one or more processors to cause the computing system to perform operations. In the example computing system, the operations can include obtaining an output of a machine-learned agent model. In the example computing system, the output can include a next state feature generated by the machine-learned agent model based on a sequence of preceding states. In the example computing system, the operations can include processing, using a machine-learned reward model, the output and the sequence of preceding states to generate a quality indicator that indicates a quality of the next state feature in view of the preceding states. In the example computing system, the machine-learned reward model was trained by, for a respective training input and one or more respective training outputs, retrieving reference data from a reference data source and computing one or more quality indicators in view of the respective training input, the one or more respective training outputs, and the reference data. In the example computing system, the operations can include outputting the quality indicator to a model trainer for updating the machine-learned agent model based on the quality indicator.

In one example aspect, the present disclosure provides one or more example non-transitory computer-readable media storing instructions that are executable by one or more processors to cause a computing system to perform operations. In the example non-transitory computer-readable media, the operations can include obtaining an output of a machine-learned agent model. In the example non-transitory computer-readable media, the output can include a next state feature generated by the machine-learned agent model based on a sequence of preceding states. In the example non-transitory computer-readable media, the operations can include processing, using a machine-learned reward model, the output and the sequence of preceding states to generate a quality indicator that indicates a quality of the next state feature in view of the preceding states. In the example non-transitory computer-readable media, the machine-learned reward model was trained by, for a respective training input and one or more respective training outputs, retrieving reference data from a reference data source and computing one or more quality indicators in view of the respective training input, the one or more respective training outputs, and the reference data. In the example non-transitory computer-readable media, the operations can include outputting the quality indicator to a model trainer for updating the machine-learned agent model based on the quality indicator.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to describe the related principles.

BRIEF DESCRIPTION OF THE DRAWINGS

Detailed discussion of embodiments directed to one of ordinary skill in the art is set forth in the specification, which makes reference to the appended figures, in which:

FIG. 6 is a flow chart diagram of an example method for implementing techniques according to example aspects of some embodiments of the present disclosure;

FIG. 7 is a flow chart diagram of an example method for implementing techniques according to example aspects of some embodiments of the present disclosure; and FIG. 8 is a flow chart diagram of an example method for implementing techniques according to example aspects of some embodiments of the present disclosure.

Figure 1A:
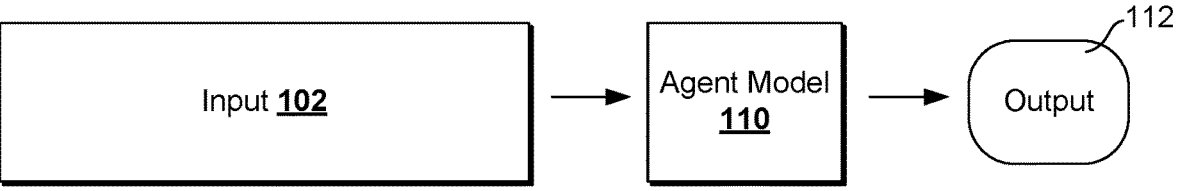
FIG. 1A is a block diagram of an example system for implementing machine-learned agent models according to example aspects of some embodiments of the present disclosure.

Reference numerals that are repeated across plural figures are intended to identify the same features in various implementations.

DETAILED DESCRIPTION

Overview

Example techniques of the present disclosure generally relate to reinforcement learning techniques for training machine-learned models. For instance, example implementations provide for a machine-learned reward model that computes a quality indicator that can be a feedback signal used to train a machine-learned agent model in a reinforcement learning environment. The reward model can itself be trained using a machine-learned supervisor model which generates reference quality indicators against which the quality indicators from the reward model can be compared for training. The supervisor model can leverage access to reference data sources to improve the accuracy of the reference quality signals as compared to the reward model. In this manner, for instance, such world knowledge can be distilled into the reward model. As such, example implementations can reduce or eliminate the use of human feedback for reinforcement learning, handcrafted heuristics for feedback, etc., which can improve consistency and decrease training times and costs.

For instance, a machine-learned agent model can process an input sequence (example agent models can include sequence-to-sequence models, such as large language models). For example, the input sequence can include a user query. The input sequence can include system context. The agent model can process the input sequence to generate an output. The output can be a next step to perform in order to satisfy the user query. The next step can include answering a question, manipulating the input, generating reasoning about the query, etc.

The steps can be associated with states of the system. A sequence of states can trace the steps taken by the model to service a query by logging an input/output history of the agent model (e.g., for a particular session). A sequence of states can include system context associated with the inputs or outputs.

The next step can include performing an action using a tool that is external to the agent model. For instance, the action can be a search action and the tool can be a search engine. The tool can return a result. The action and the result can be added to the input sequence for further processing by the agent model. For instance, the agent model can process the updated input sequence to determine if the user query has been satisfied (e.g., the requested information obtained, etc.), such as by outputting a finish token.

The agent model can be fine-tuned for various tasks. To further improve the performance of the agent model, example implementations of the present disclosure provide for additional feedback signals for further training (e.g., in a reinforcement learning context). For example, a reward model can inspect the output(s) of the agent model to evaluate whether the outputs are high-quality next steps based on the input sequence. For instance, the reward model can determine whether the output(s) are advancing the goal(s) set by the user query, such as whether an output action would obtain useful information or accurately concludes a sequence (e.g., with a finish token) when the query is indeed satisfied.

The feedback signals can be discrete or continuous. The feedback signals can include natural language feedback, numerical feedback, categorical feedback, etc. The feedback signals can be routed to a training pipeline for training the agent model.

Advantageously, the reward model can leverage ground truth reference data sources directly or indirectly when evaluating the output(s) of the agent model. In direct implementations, the reward model itself can be trained to directly retrieve (e.g., using tools) content from reference data sources to inform its generation of the quality signals. In indirect implementations, the reward model can be trained using training data generated based on reference data sources. For instance, a supervisor model-alone or complemented by human labelers—can refer to reference data sources to retrieve relevant reference data and evaluate output(s) of the agent model and give reference quality indicators against which the quality indicators from the reward model can be compared. The comparison can facilitate training of the reward model by updating one or more parameters of the reward model to increase a likelihood that the reward model would give quality signals in alignment with the supervisor model. In this manner, for instance, expanded world knowledge can be distilled into the reward model, as well as additional skills for recognizing and rewarding good problem solving techniques.

Example techniques of the present disclosure can provide a number of technical effects and benefits. A technical effect of example implementations of the present disclosure is more energy-efficient training operations or model updates. For example, the use of a machine-learned reward model to provide feedback signals for training an agent model can provide for lower-cost training as compared to surfacing and presenting inputs and outputs for human review. Further, the use of a machine-learned reward model of the present disclosure to provide feedback signals for training an agent model can provide for more sample-efficient training by leveraging reference data sources to train (or execute) the machine-learned reward model to more effectively generate feedback signals, such that training of the agent model can converge or approach a desired performance more quickly over a smaller set of training cycles. In this manner, for instance, techniques of the present disclosure can provide for a given level of functionality to be obtained in fewer training iterations, thereby expending a smaller energy budget to satisfy a given performance target. In some scenarios, training techniques of the present disclosure can provide for an extended level of functionality to be obtained in a given number of training iterations, thereby more efficiently using a given energy budget to achieve greater results than before possible.

In this manner, for instance, the improved energy efficiency of example implementations of the present disclosure can effectively reduce an amount of pollution or other waste associated with implementing machine-learned models and systems, thereby advancing the fields of machine-learning and artificial intelligence as a whole. The amount of pollution can be reduced in toto (e.g., an absolute magnitude thereof) or on a normalized basis (e.g., energy per task, per model size, etc.). For example, an amount of $CO_2$ released (e.g., by a power source) in association with training and execution of machine-learned models can be reduced by implementing more energy-efficient training or inference operations. An amount of heat pollution in an environment (e.g., by the processors/storage locations) can be reduced by implementing more energy-efficient training or inference operations.

A technical effect of example implementations of the present disclosure is more granular control and separation of the runtime data processed by and output from the agent model. For instance, the rich context available to a supervisor model can be used to train a powerful reward model that can operate independently of the supervisor model and its implementing systems. As such, the reward model can be hosted on the same or a different system. For instance, the reward model can be a compact, lightweight model (at least as compared to the supervisor model) that distills the relevant performance attributes of the supervisor model. This can enable the reward model to be deployed locally with the agent model, limiting the opportunities for data transfer across networks, entities, etc., thereby improving data security and privacy, as well as reducing network transmissions and freeing network bandwidth for other tasks.

Reference now is made to the figures, which provide example arrangements of computing systems, model structures, and data flows for illustration purposes only.

FIG. 1A illustrates an example system for implementing a machine-learned agent model according to aspects of the present disclosure. An input 102 can include data that contain data describing a query or a task to be performed. Machine-learned agent model 110 can process input 102 to generate an output 112.

Figure 1B:
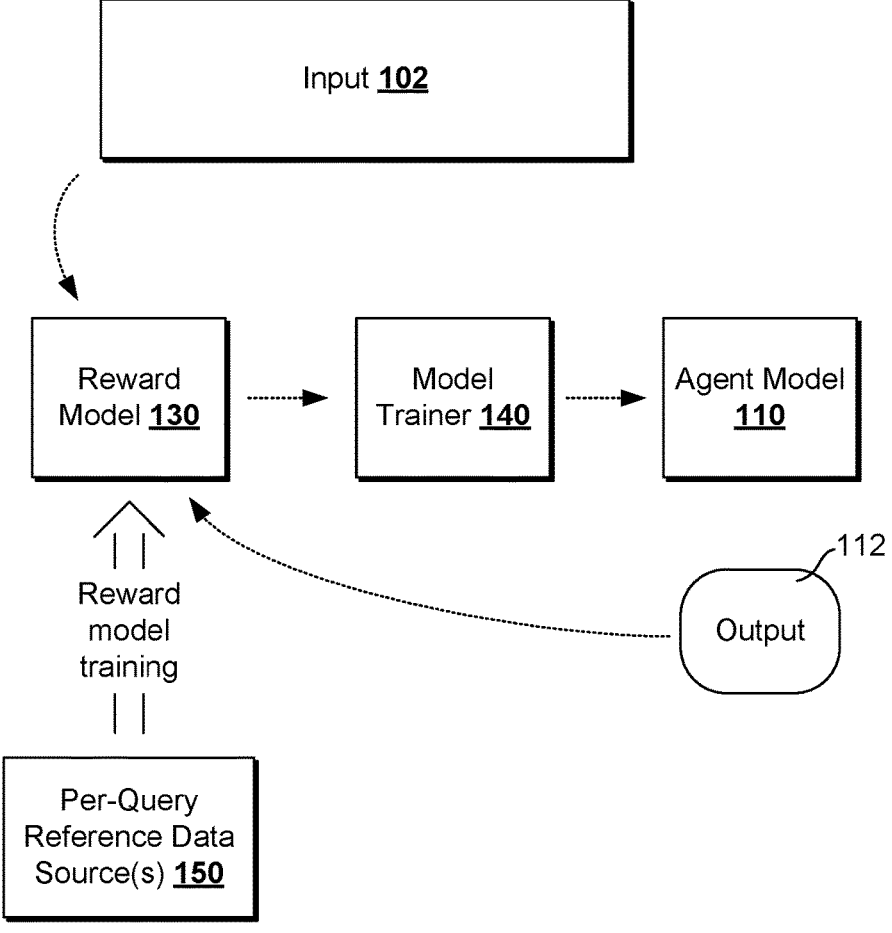
FIG. 1B is a block diagram of an example system for training machine-learned agent models according to example aspects of some embodiments of the present disclosure.

FIG. 1B illustrates an example system for training agent model 110. Machine-learned reward model 130 can evaluate a quality of output 112 in view of input sequence 102. Reward model 130 can output a quality indicator to model trainer 140 which can train agent model 110 based on the quality signal. Reward model 130 can be trained using per-query reference data source(s) 150 to help reward model 130 learn to distinguish high quality outputs from lower quality outputs. Training dataflows are shown with dotted lines. Runtime/inference implementations of agent model 110 (e.g., of FIG. 1A) can include or omit the training dataflows.

Input 102 can include a variety of data types. Input 102 can include image data. Agent model 110 can process the image data to generate an output 112. As an example, agent model 110 can process the image data to generate an image recognition output 112 (e.g., a recognition of the image data, a latent embedding of the image data, an encoded representation of the image data, a hash of the image data, etc.). As another example, agent model 110 can process the image data to generate an image segmentation output 112. As another example, agent model 110 can process the image data to generate an image classification output 112. As another example, agent model 110 can process the image data to generate an image data modification output 112 (e.g., an alteration of the image data, etc.). As another example, agent model 110 can process the image data to generate an encoded image data output 112 (e.g., an encoded and/or compressed representation of the image data, etc.). As another example, agent model 110 can process the image data to generate an upscaled image data output 112. As another example, agent model 110 can process the image data to generate a prediction output 112.

In some implementations, Input 102 can include text or natural language data. Agent model 110 can process the text or natural language data to generate an output 112. As an example, agent model 110 can process the natural language data to generate a language encoding output 112. As another example, agent model 110 can process the text or natural language data to generate a latent text embedding output 112. As another example, agent model 110 can process the text or natural language data to generate a translation output 112. As another example, agent model 110 can process the text or natural language data to generate a classification output 112. As another example, agent model 110 can process the text or natural language data to generate a textual segmentation output 112. As another example, agent model 110 can process the text or natural language data to generate a semantic intent output 112. As another example, agent model 110 can process the text or natural language data to generate an upscaled text or natural language output 112 (e.g., text or natural language data that is higher quality than the input text or natural language, etc.). As another example, agent model 110 can process the text or natural language data to generate a prediction output 112.

Input 102 can include speech data. Agent model 110 can process the speech data to generate an output 112. As an example, agent model 110 can process the speech data to generate a speech recognition output 112. As another example, agent model 110 can process the speech data to generate a speech translation output 112. As another example, agent model 110 can process the speech data to generate a latent embedding output 112. As another example, agent model 110 can process the speech data to generate an encoded speech output 112 (e.g., an encoded and/or compressed representation of the speech data, etc.). As another example, agent model 110 can process the speech data to generate an upscaled speech output 112 (e.g., speech data that is higher quality than the input speech data, etc.). As another example, agent model 110 can process the speech data to generate a textual representation output 112 (e.g., a textual representation of the input speech data, etc.). As another example, agent model 110 can process the speech data to generate a prediction output 112.

Input 102 can include latent encoding data (e.g., a latent space representation of an input, etc.). Agent model 110 can process the latent encoding data to generate an output 112. As an example, agent model 110 can process the latent encoding data to generate a recognition output 112. As another example, agent model 110 can process the latent encoding data to generate a reconstruction output 112. As another example, agent model 110 can process the latent encoding data to generate a search output 112. As another example, agent model 110 can process the latent encoding data to generate a reclustering output 112. As another example, agent model 110 can process the latent encoding data to generate a prediction output 112.

Input 102 can include statistical data. Statistical data can be, represent, or otherwise include data computed and/or calculated from some other data source. Agent model 110 can process the statistical data to generate an output 112. As an example, agent model 110 can process the statistical data to generate a recognition output 112. As another example, agent model 110 can process the statistical data to generate a prediction output 112. As another example, agent model 110 can process the statistical data to generate a classification output 112. As another example, agent model 110 can process the statistical data to generate a segmentation output 112. As another example, agent model 110 can process the statistical data to generate a visualization output 112. As another example, agent model 110 can process the statistical data to generate a diagnostic output 112.

Input 102 can include sensor data. Agent model 110 can process the sensor data to generate an output 112. As an example, agent model 110 can process the sensor data to generate a recognition output 112. As another example, agent model 110 can process the sensor data to generate a prediction output 112. As another example, agent model 110 can process the sensor data to generate a classification output 112. As another example, agent model 110 can process the sensor data to generate a segmentation output 112. As another example, agent model 110 can process the sensor data to generate a visualization output 112. As another example, agent model 110 can process the sensor data to generate a diagnostic output 112. As another example, agent model 110 can process the sensor data to generate a detection output 112.

In some cases, agent model 110 can be configured to perform a task that includes encoding input data for reliable and/or efficient transmission or storage (and/or corresponding decoding). For example, the task may be an audio compression task. Input 102 may include audio data and the output 112 may comprise compressed audio data. In another example, the input includes visual data (e.g. one or more images or videos), the output 112 comprises compressed visual data, and the task is a visual data compression task. In another example, the task may comprise generating an embedding for input data (e.g. input audio or visual data).

In some cases, input 102 includes visual data and the task is a computer vision task. In some cases, the input includes pixel data for one or more images and the task is an image processing task. For example, the image processing task can be image classification, where the output 112 is a set of scores, each score corresponding to a different object class and representing the likelihood that the one or more images depict an object belonging to the object class. The image processing task may be object detection, where the image processing output 112 identifies one or more regions in the one or more images and, for each region, a likelihood that region depicts an object of interest. As another example, the image processing task can be image segmentation, where the image processing output 112 defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output 112 defines, for each pixel in the one or more images, a respective depth value. As another example, the image processing task can be motion estimation, where the network input includes multiple images, and the image processing output 112 defines, for each pixel of one of the input images, a motion of the scene depicted at the pixel between the images in the network input.

In some cases, input 102 includes audio data representing a spoken utterance and the task is a speech recognition task. The output 112 may comprise a text output 112 which is mapped to the spoken utterance. In some cases, the task comprises encrypting or decrypting input data. In some cases, the task comprises a microprocessor performance task, such as branch prediction or memory address translation.

Input 102 can be obtained from a variety of sources. Input 102 can be obtained from one or more computing systems that may be the same as or different from a computing system implementing agent model 110. Input 102 can be received over a network connection via an application programming interface (API). For instance, agent model 110 can be hosted as a managed or unmanaged machine-learning model service in the cloud for serving machine-learned outputs to client systems (e.g., lightweight endpoints) over a network connection.

Agent model 110 can be or include various different kinds of machine-learned models. Agent model 110 can include sequence-to-sequence machine-learned models. Agent model 110 can include a transformer model architecture. Agent model 110 can include a large language model. Agent model 110 can be configured to follow instructions or commands or otherwise service queries provided to agent model 110 in input 102. Agent model 110 can include various other model architectures, such as RNN, CNN, LSTM, etc. model structures.

Agent model 110 can be pretrained over a corpus of training data. For instance, pre-training can include unsupervised training tasks performed over a large corpus of diverse training data. Agent model 110 can be aligned with one or more tasks. Alignment can include fine-tuning agent model 110 to improve performance on one or more tasks. Alignment can include reinforcement learning based on in situ (or ex situ) feedback signals.

Reward model 130 can process output 112 in view of input 102 to generate feedback signals indicating a quality of the output 112. For instance, reward model 130 can generate a quality indicator. A quality indicator can include a value associated with a quality assessment. The value can correspond to a qualitative or quantitative assessment of quality. A quality indicator can be a binary flag of acceptable output. A quality indicator can be a numerical score associated with a quality scale. For instance, a numerical score can include a log-likelihood of a goodness of a output. A quality indicator can be a language-based descriptor of quality (e.g., "satisfactory," "unsatisfactory").

Reward model 130 can be or include various different kinds of machine-learned models. Reward model 130 can include sequence-to-sequence machine-learned models. Reward model 130 can include a transformer model architecture. Reward model 130 can include a large language model. Reward model 130 can be configured to follow instructions or commands or otherwise service queries provided to reward model 130. Reward model 130 can include various other model architectures, such as RNN, CNN, LSTM, etc. model structures. Reward model 130 can be the same as or different from agent model 110. Reward model 130 can be smaller than agent model 110.

Reward model 130 can be pretrained over a corpus of training data. For instance, pre-training can include unsupervised training tasks performed over a large corpus of diverse training data. Reward model 130 can be aligned with one or more tasks (e.g., a reward generation task). Alignment can include fine-tuning reward model 130 to improve performance on one or more tasks.

Model trainer 140 can receive feedback signal(s) from reward model 130 and initiate updates to agent model 110. Model trainer 140 can compute updates to one or more parameters of agent model 110 based on the feedback signal(s) from reward model 130. Model trainer 140 can generate updates to agent model 110 based on additional feedback signals. Other feedback signals can be determined based on output 112, such as heuristics or other quality metrics (e.g., not generated by reward model 130).

Model trainer 140 can implement various reinforcement learning algorithms. In general, model trainer 140 can update agent model 110 to optimize for an expected reward, such as an expected reward averaged over possible output(s). A simple policy gradient can be used. Various other algorithms can be used, such as REINFORCE, TPRO, PPO, etc.

Advantageously, reward model 130 can leverage per-query reference data source(s) 150 directly or indirectly when evaluating output 112 of agent model 110. For example, evaluating output 112 of agent model 110 can be informed by external sources of information. For instance, in a question-answering context, reward model 130 can determine whether a provided output 112 completely or accurately answers the input question. External sources can inform this determination. Similarly, external sources can inform quality determinations with respect to other tasks, such as image processing tasks (e.g., such as retrieving known attributes of a detected object), language processing tasks (e.g., such as retrieving known definitions from a dictionary), data analysis tasks (e.g., such as retrieving data from published, up-to-date data sources), etc.

Per-query reference data source(s) 150 can refer to data retrieved from a reference data source based on the contents of a given query. For instance, per-query reference data source(s) 150 can include documents or other data retrieved from a search of a database or online resources. For instance, a search can be performed to obtain search results. The search results can be summarized and returned as per-query reference data source(s) 150. For instance, a machine-learned natural language processing model can summarize content retrieved from reference data sources. Other types of content can be returned (e.g., in addition or alternative to natural language data). Machine-learned models can compress, condense, or embed such content into a format processable by one or more models (e.g., reward model 130, another model used to train reward model 130, etc.).

In addition or alternative to use in training agent model 110, the quality indicator(s) can be used to guide selection of output(s) from agent model 110. For instance, multiple output(s) 112 can be sampled from agent model 110. Reward model 130 can output a quality indicator for each sampled output. A preferred output can be selected from the sampled outputs based on the quality indicator associated with the preferred output. For instance, the quality indicator(s) can be used to rank a sampled plurality of outputs from agent model 110. The system can then return the top ranked output as output 112.

Figure 2:
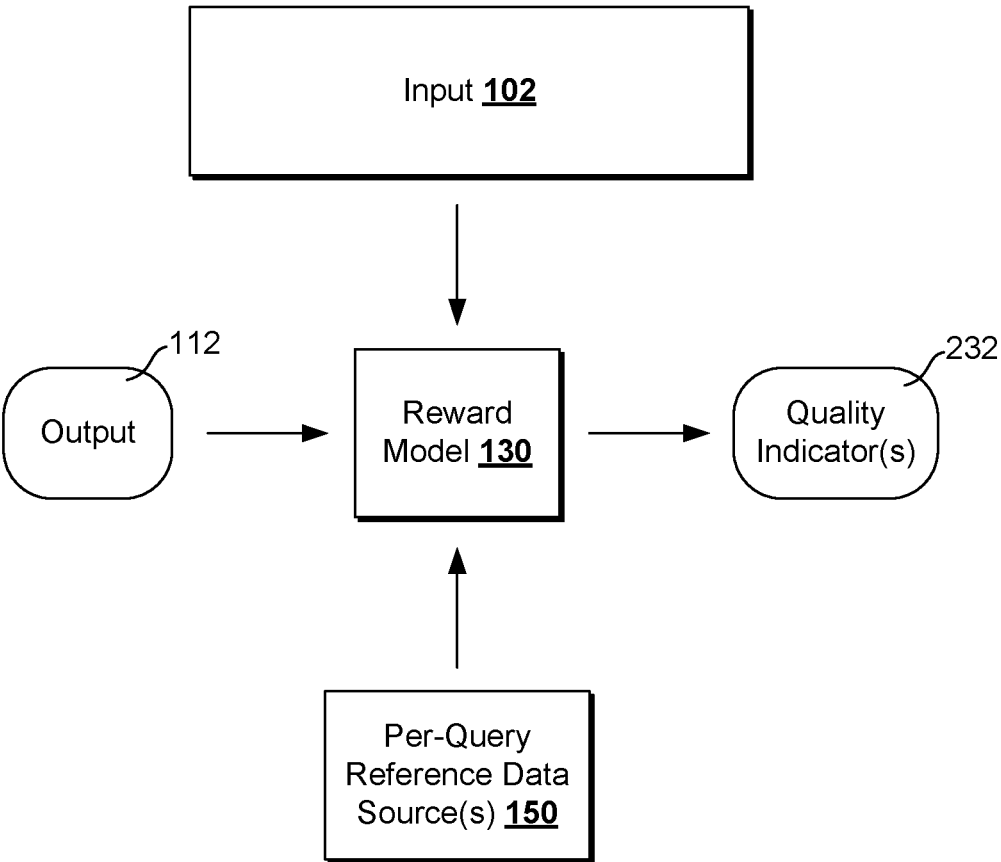
FIG. 2 is a block diagram of an example system for implementing and training machine-learned agent models according to example aspects of some embodiments of the present disclosure.

FIG. 2 illustrates an example implementation in which reward model 130 can process data from per-query reference data sources 150. In some direct implementations, reward model 130 itself can be trained to directly retrieve (e.g., using external data retrieval tools) content from reference data sources to inform its generation of the quality signals.

For instance, reward model 130 can receive a number of inputs, including the input 102, output 112, and data from source(s) 150, and output quality indicator(s) 232.

For instance, a set of instructions to reward model 130 can include inputs structured as follows:

Input: <input 102>
Output: <output 112>
Context: <data from Per-Query Reference Data Source(s) 150>

The set of instructions can include a command to output the quality indicator(s) 232. The command can be implicit. For instance, reward model 130 can be trained to output quality indicator(s) 232 for any input. The command can be a natural language command, question, or instruction, such as, "Is Output a satisfactory response to Input in view of Context?"

Figure 3:
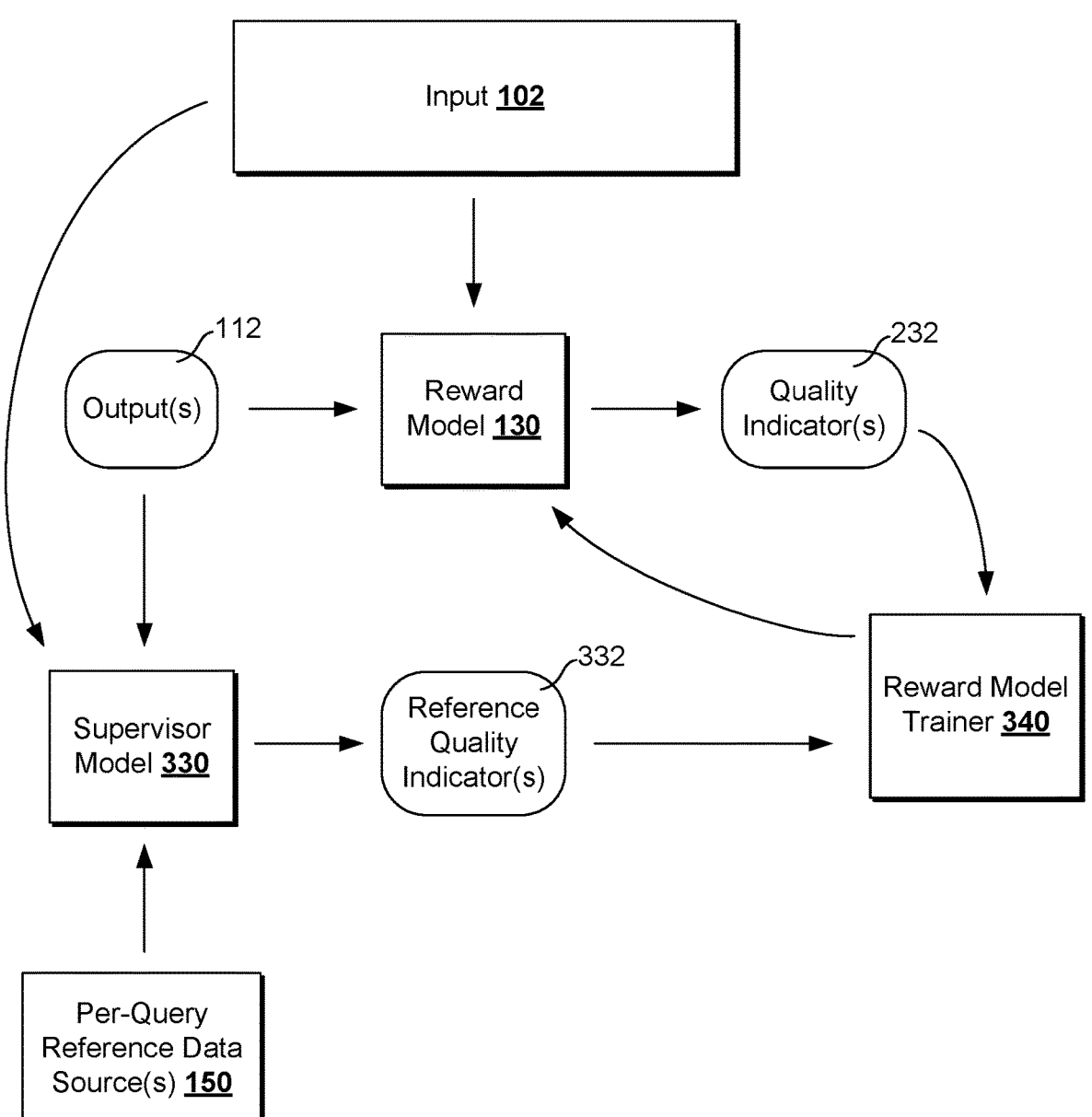
FIG. 3 is a block diagram of an example system for implementing machine-learned reward models according to example aspects of some embodiments of the present disclosure.

FIG. 3 illustrates an example implementation in which reward model 130 can encode or distill knowledge from per-query reference data sources 150. For instance, in some indirect implementations, reward model 130 can be trained using training data dynamically generated on a per-query basis using reference data sources 150.

For instance, supervisor model 330 can process input 102 and output 112 in view of per-query reference data source(s) 150 to generate a reference quality indicator 332 that can be used by reward model trainer 340 to update reward model 130 (e.g., by comparing reference quality indicator 332 and quality indicator(s) 232). This can facilitate training of reward model 130 by updating one or more parameters of reward model 130 to increase a likelihood that reward model 130 would give quality signals in alignment with supervisor model 330, even if reward model 130 is not provided access to reference data sources 150 at runtime. In this manner, for instance, expanded world knowledge can be distilled into reward model 130, as well as additional skills for recognizing and rewarding good problem-solving or task-completion techniques more generally.

Supervisor model 330 can be or include various different kinds of machine-learned models. Supervisor model 330 can include sequence-to-sequence machine-learned models. Supervisor model 330 can include a transformer model architecture. Supervisor model 330 can include a large language model. Supervisor model 330 can be configured to follow instructions or commands or otherwise service queries provided to supervisor model 330. Supervisor model 330 can include various other model architectures, such as RNN, CNN, LSTM, etc. model structures. Supervisor model 330 can be the same as or different from agent model 110 or reward model 130. Supervisor model 330 can be larger than reward model 130.

Supervisor model 330 can be pretrained over a corpus of training data. For instance, pre-training can include unsupervised training tasks performed over a large corpus of diverse training data. Supervisor model 330 can be aligned with one or more tasks (e.g., a reward generation or quality indicator generation task). Alignment can include fine-tuning supervisor model 330 to improve performance on one or more tasks.

Supervisor model 330 can be configured to make the same quality determination as reward model 130, except with the benefit of more information. For instance, reward model 130 can be configured to output a quality value (e.g., predict, regress, etc.) indicating a quality. Supervisor model 330 can be configured to make output a corresponding reference quality value. Reward model trainer 340 can compare the quality value and the corresponding reference quality value to determine a loss (e.g., based on a difference between the quality value and the corresponding reference quality value). The loss can be backpropagated through reward model 130 or otherwise used to determine one or more updates to the parameters of reward model 130.

For instance, a supervisor model 330 can generate reference quality indicator(s) 332 based on instructions that can have the following format:

Input: <input 102>

Output(s): <output(s) 112>

Context: <data from Per-Query Reference Data Source(s) 150>

The set of instructions can include a command to output the reference quality indicator(s) 332. The command can be implicit. For instance, supervisor model 330 can be trained to output reference quality indicator(s) 332 for any input. The command can be a natural language command, question, or instruction.

Supervisor model 330 can be configured to make a different quality determination from reward model 130. For instance, reward model 130 can be configured to output a binary flag indicating whether an output appears to satisfy a quality threshold. Supervisor model 330 can be configured to compare different outputs to determine a preferred output. This diversity in task can improve the robustness of reward model 130 by introducing different inductive pathways into the training pipeline. This diversity can provide both positive instruction (e.g., examples of preferred outputs which should receive more positive rewards) and negative instruction (e.g., examples of disfavored outputs which should receive less positive rewards).

For instance, reward model 130 can generate a plurality of quality indicator(s) 232 that respectively correspond to a plurality of output(s) 112. Supervisor model 330 can retrieve context data from per-query reference data source(s) 150 based on the input 102 (e.g., the input query). Supervisor model 330 can compare how well the output(s) 112 advance the objective of input 102. Supervisor model 330 can output reference quality indicator(s) 332 that contain preference labels across the output(s) 112.

For instance, reference quality indicator(s) 332 can include a one-hot vector that identifies the preferred output from output(s) 112. The quality indicator(s) 232 can be compiled into a logit (e.g., an N-dimensional logit for N quality indicator(s) 232) that can be compared against the one-hot vector from reference quality indicator(s) 332. For instance, a cross-entropy loss can be computed between the one-hot vector and the logit.

Reference quality indicator(s) 332 can include a ranking of the output(s) 112 that can be used to train reward model 130 to prefer higher-ranked output(s) over lower-ranked output(s).

For instance, a supervisor model 330 can generate reference quality indicator(s) 332 based on instructions that can have the following format:

Input: <input 102>

Output(s): <output(s) 112>

Context: <data from Per-Query Reference Data Source(s) 150>

Task: Indicate preferred output of Output(s).

For example, for a language-model based supervisor model 330, an example input prompt can be as follows:

<Prompt>

REFERENCES

Alexander Graham Bell is widely credited with inventing the telephone. He was awarded the first US patent for an "improvement in telegraphy" in 1876, which described the process of transmitting vocal or musical sounds telegraphically. However, several inventors such as Elisha Gray and Antonio Meucci had also developed similar devices and made substantial contributions to the invention of the telephone. It is important to note that the telephone as we know it today is the result of the collective efforts and innovations of multiple inventors and not just the work of one individual.

Question) Who invented telephone?

Answer-A) [Alexander Graham Bell got the idea for the telephone while working on a device to help the deaf hear.]

Answer-B) [Alexander Graham Bell is the most famous inventor of the telephone, but the development of the telephone was the culmination of work done by many individuals including Antonio Meucci, Elisha Gray, and Thomas Edison.]

Given above references, which among Answer A or B better answer Question? Just answer A or B.

<LLM Output>

Answer-B

The answer from supervisor model 330 can be converted into a format that can be used by reward model trainer 340. For instance, the answer can be converted to a one-hot vector indicating the selected answer.

Figure 4:
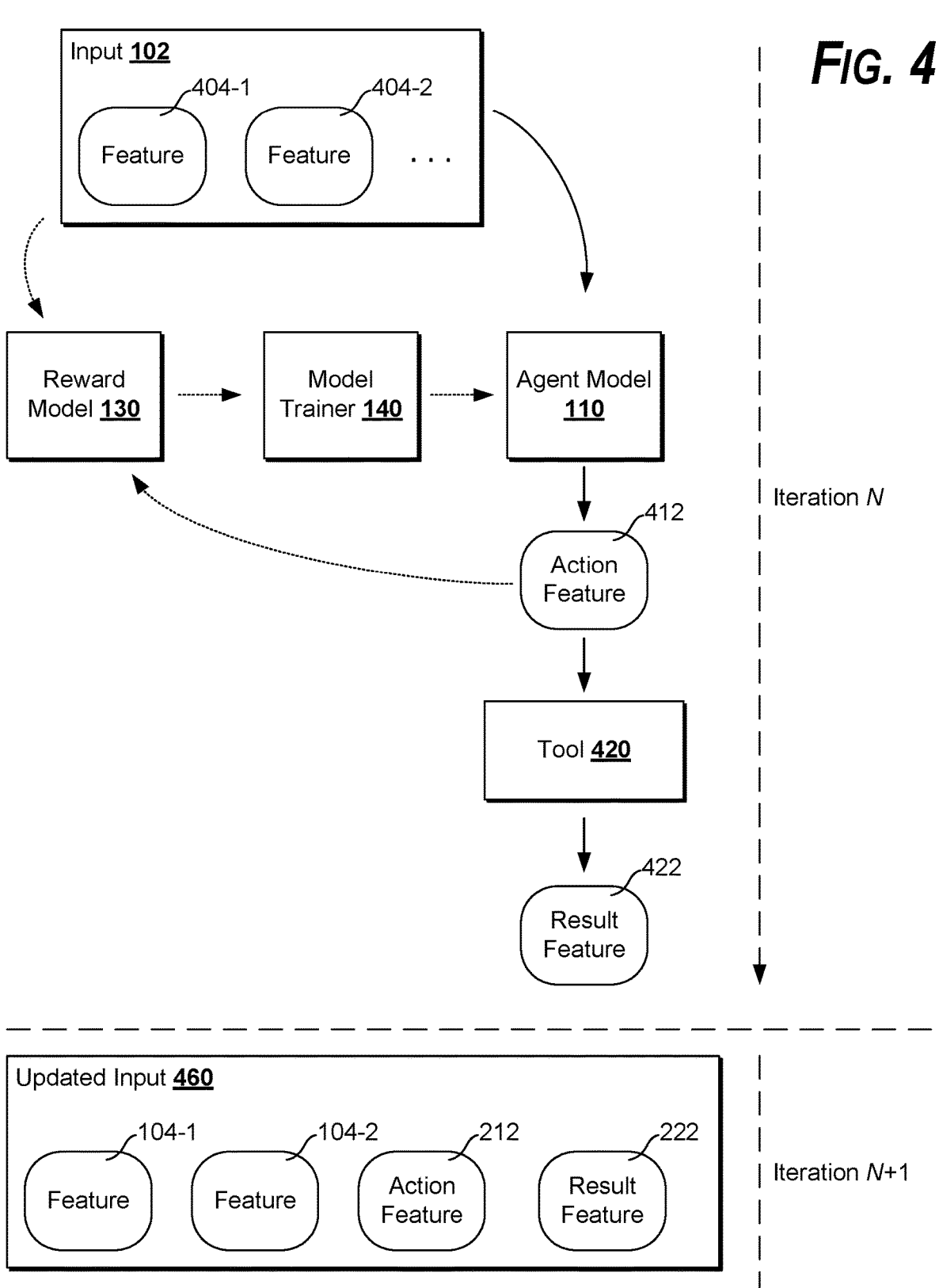
FIG. 4 is a block diagram of an example system for training machine-learned reward models according to example aspects of some embodiments of the present disclosure.

FIG. 4 illustrates an example implementation of reward model 130 in an iterative processing flow. Input 102 can include a sequence of state features 404-1, 404-2, . . . , etc. Agent model 110 can process input 102 to output an action feature 412. Action feature 412 can specify an action to be performed by a tool 420 to generate a result feature 422. In future iterations, the system can build on the input 102 to add the action feature 412 and result feature 422 to obtain an updated input 402. The cycle can repeat until a stopping criterion is satisfied. For instance, a stopping criterion can include the output of an action feature including a finish token that signals that the objective of the input 102 is satisfied.

An example state space representation can be represented as $S_0=[w_1, . . . ]$=Task prompt+User Query; $S_1=[w_1, . . . ]=S_0+[Action_0+Result_0]$; . . . , etc., wherein w indicates input features.

An example action feature 412 indicating an action can include a sequence of {soa}[ActionFunction]{eoa}, where {sas} is a start of action token and {eas} is an end of action token and [ActionFunction] can be a function call to a tool.

Action functions can include substantially any tool call to a tool 420. A few example action functions are described here. One example action function can be represented as Thought (text), which can generate internal reasoning for the agent model to process in future iterations. One example action function can be represented as Search (text), which can pass text to a search engine or other data sources. Search can be configured to summarize contents of top N found links and return a list of summarizations. One example action function can be represented as Lookup (text, keyword), which can pass text to a search engine or other data sources and apply keyword parsing to the results to return content matching the keyword search (e.g., looking for first paragraphs with the keyword from top N found links and returning concatenation of the paragraphs, etc.). One example action function can be represented as Calculator (text), which can receive an algebraic problem as text and return a solution to the problem. One example action function can be represented as Finish (text), which can return text as a final result in a sequence to satisfy an initial user query.

Result feature 422 can include substantially any output of a tool 420. This can be termed an "observation," such as an "observation" of the external world external to agent model 110.

An example series of states follows:

<Task Prompt>

You can execute actions from this list: Thought [sentences], Search [sentence], Lookup [keyword], Finish [sentence].

Refer to these examples and write similarly formatted texts following the question at the end.

Example 1

Question) Which magazine was started first Arthur's Magazine or First for Women?

Thought 1) I need to search Arthur's Magazine and First for Women, and find which was started first.

Action 1) Search [Arthur's Magazine]

Observation 1) Arthur's Magazine (1844-1846) was an American literary periodical published in Philadelphia . . .

Thought 2) Arthur's Magazine was started in 1844. I need to search First for Women next.

Action 2) Search [First for Women]

Observation 2) First for Women is a woman's magazine published by Bauer Media Group . . . was started in 1989 . . .

Thought 3) First for Women was started in 1989. 1844 (Arthur's Magazine)<1989 (First for Women), so Arthur's Magazine was started first.

Action 3) Finish [Arthur's Magazine]

<User Query>

Question) Who invented telephone?

<Actions & Observations>

Thought 1) I need to find out who invented the telephone.

Action 1) Search [Who invented telephone]

Observation 1) Alexander Graham Bell is credited with inventing the telephone in 1876.

Thought 2) Alexander Graham Bell invented the telephone in 1876.

Action 2) Search [Alexander Graham Bell]

Observation 2) Alexander Graham Bell was a Scottish-born scientist, inventor, engineer, and innovator who is credited with inventing the first practical telephone. He was born in 1847 in Edinburgh, Scotland, and died in 1922 in Baddeck, Nova Scotia, Canada.

Thought 3) Alexander Graham Bell was a Scottish-born scientist, inventor, engineer, and innovator who is credited with inventing the first practical telephone.

Action 3) Finish [Alexander Graham Bell]

Training dataflows (dotted lines) can be present in one or more iterations in whole or in part. Runtime/inference implementations can include or omit the training dataflows. Reward model 130 can generate quality indicator(s) based on action feature 412 and input 102. The quality indicator(s) can be used to update agent model 110 in real time or with a time shift (e.g., batch processing at times of low demand).

The quality indicator(s) can be used to guide selection of output(s) from agent model 110. For instance, the quality indicator(s) can be used to rank a sampled plurality of outputs from agent model 110. The system can then return the top ranked output as output 112/412.

Example Devices and Systems

Figure 5A:
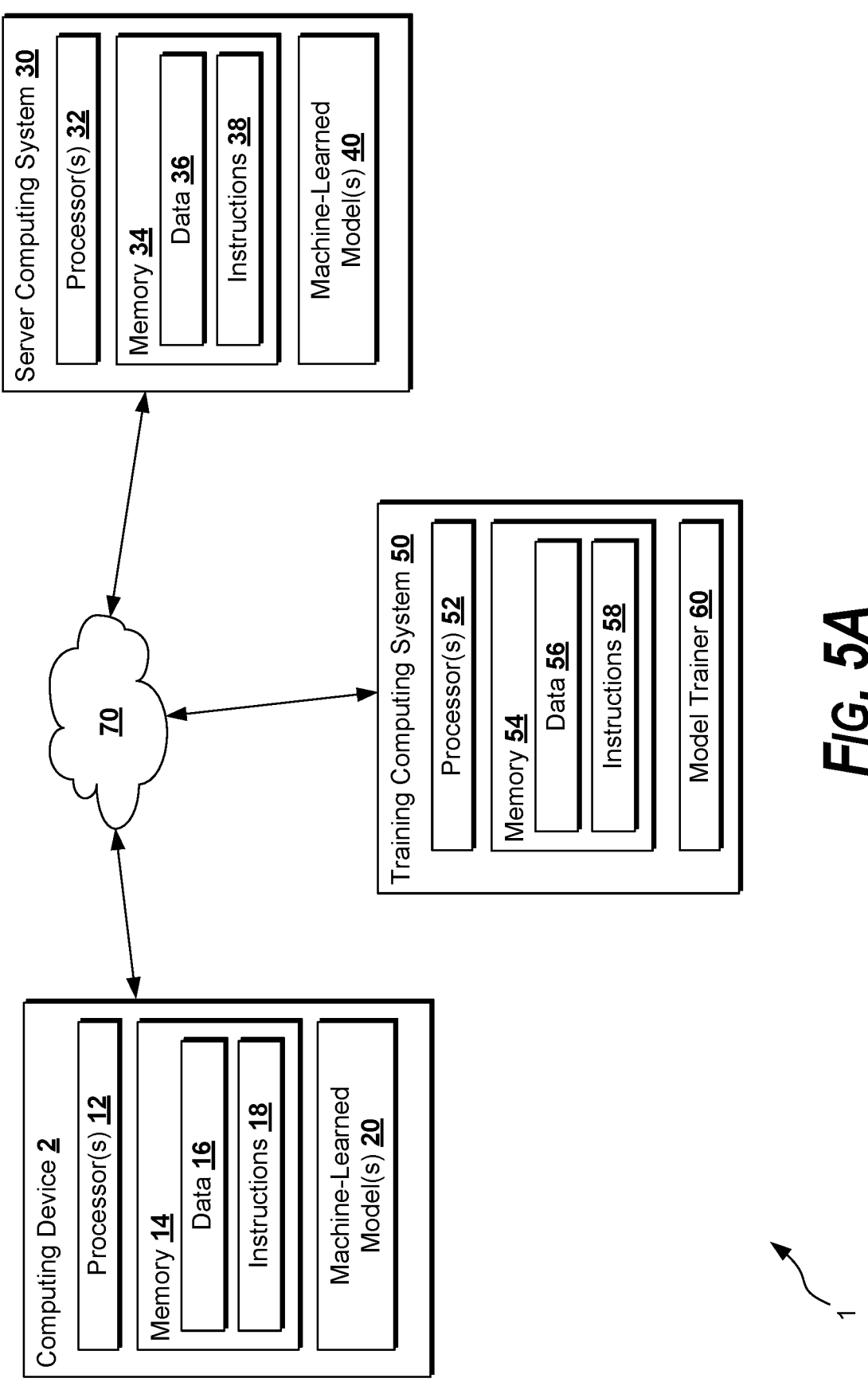
FIG. 5A is a block diagram of an example computing system for implementing techniques according to example aspects of some embodiments of the present disclosure.

FIG. 5A depicts a block diagram of an example computing system 1 that can perform according to example embodiments of the present disclosure. The system 1 includes a computing device 2, a server computing system 30, and a training computing system 50 that are communicatively coupled over a network 70.

The computing device 2 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to perform operations implementing input data structures and self-consistency output sampling according to example embodiments of the present disclosure, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Model(s) 20 can include any one or more of agent model 110, reward model 130, supervisor model 330, etc.

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20.

Additionally, or alternatively, one or more machine-learned models 40 can be included in or otherwise stored and implemented by the server computing system 30 that communicates with the computing device 2 according to a client-server relationship. Model(s) 40 can include any one or more of agent model 110, reward model 130, supervisor model 330, etc.

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more images or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

In some embodiments, the machine-learned models 40 can be implemented by the server computing system 30 as a portion of a web service (e.g., remote machine-learned model hosting service, such as an online interface for performing machine-learned model operations over a network on remote servers 30). For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations (e.g., to perform operations implementing input data structures and self-consistency output sampling according to example embodiments of the present disclosure, etc.).

In some implementations, the server computing system 30 includes or is otherwise implemented by one or more server computing devices. In instances in which the server computing system 30 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The computing device 2 or the server computing system 30 can train example embodiments of a machine-learned model (e.g., including models 20 or 40) using a pretraining pipeline (e.g., an unsupervised pipeline, a semi-supervised pipeline, etc.). In some embodiments, the computing device 2 or the server computing system 30 can train example embodiments of a machine-learned model (e.g., including models 20 or 40) using a pretraining pipeline by interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations (e.g., to perform operations implementing input data structures and self-consistency output sampling according to example embodiments of the present disclosure, etc.). In some implementations, the training computing system 50 includes or is otherwise implemented by one or more server computing devices.

The model trainer 60 can include a pretraining pipeline for training machine-learned models using various objectives. Parameters of the image-processing model(s) can be trained, in some embodiments, using various training or learning techniques, such as, for example, backwards propagation of errors. For example, an objective or loss can be backpropagated through the pretraining pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pretraining pipeline can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media. Model trainer 60 can be or include model trainer 140 or model trainer 340.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 5A illustrates one example computing system that can be used to implement the present disclosure. Other computing systems can be used as well. For example, in some implementations, the computing device 2 can include the model trainer 60. In some implementations, the computing device 2 can implement the model trainer 60 to personalize the model(s) based on device-specific data.

Figure 5B:
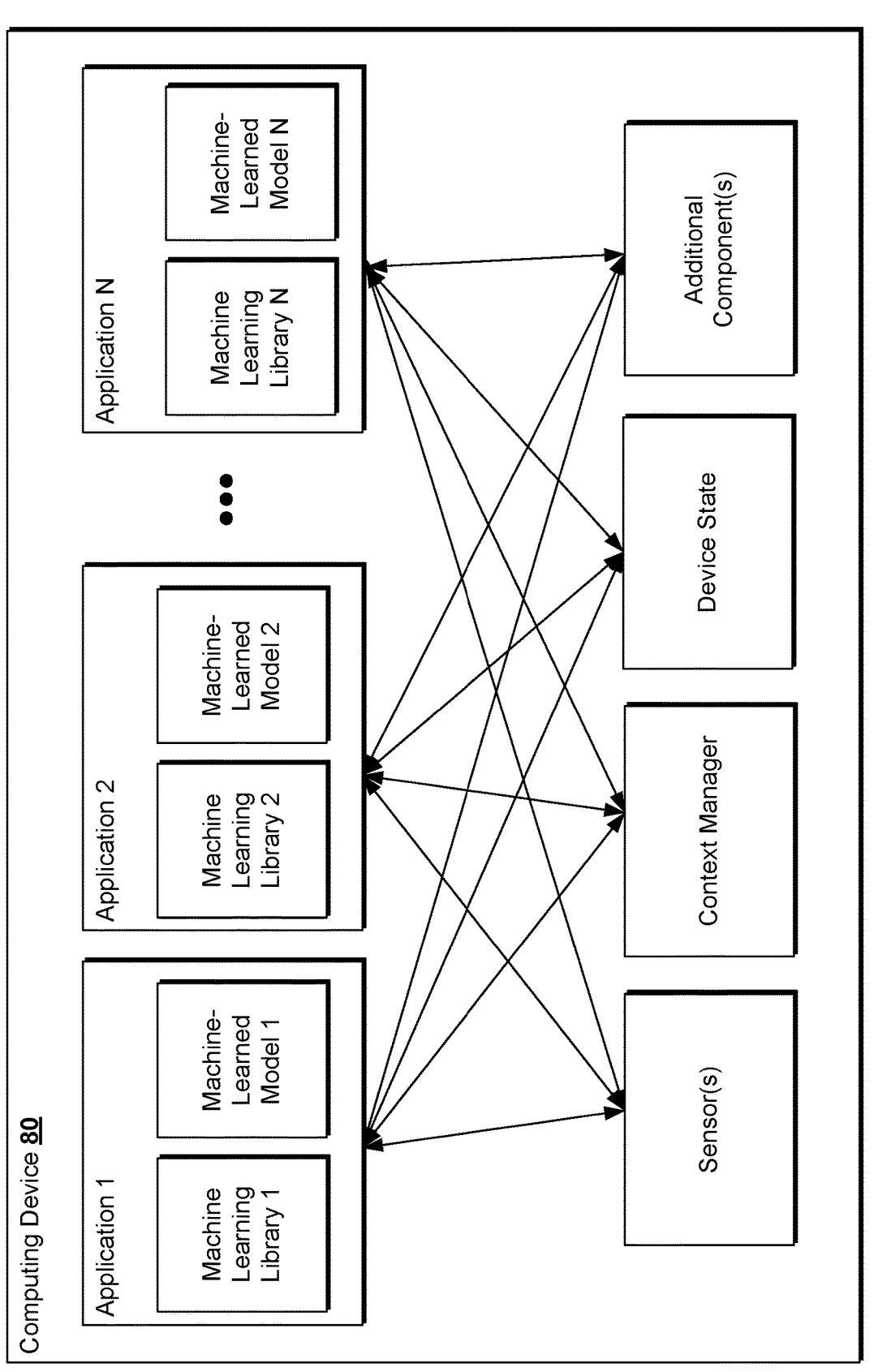
FIG. 5B is a block diagram of an example computing device for implementing techniques according to example aspects of some embodiments of the present disclosure.

FIG. 5B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 5B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

Figure 5C:
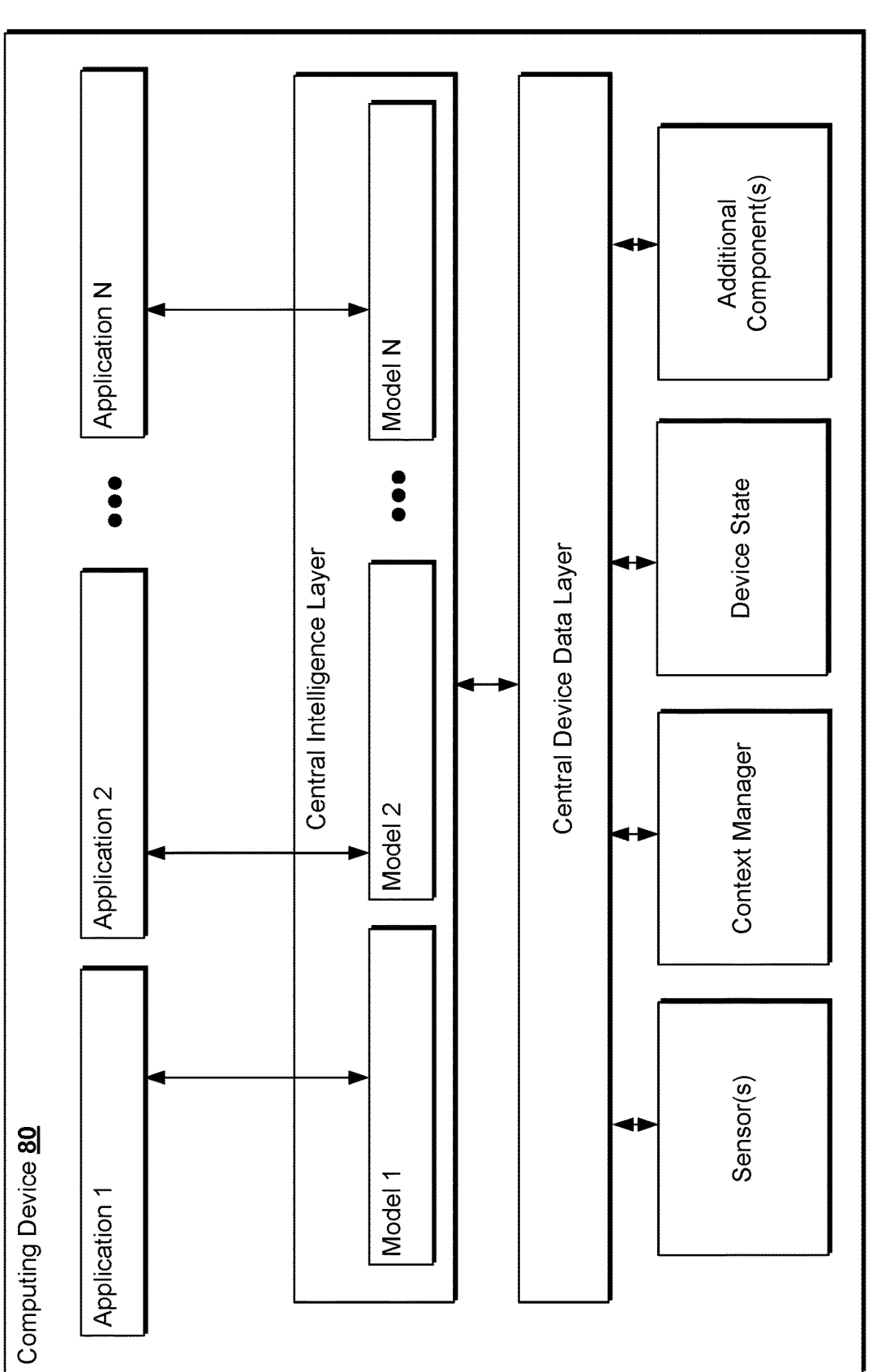
FIG. 5C is a block diagram of an example computing device for implementing techniques according to example aspects of some embodiments of the present disclosure.

FIG. 5C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 5C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 5C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

FIG. 6 depicts a flow chart diagram of an example method 600 for generating feedback signals for training a machine-learned agent model according to example embodiments of the present disclosure. Example method 600 can be implemented by one or more computing systems (e.g., one or more computing systems as discussed with respect to FIGS. 1A to 5C). Although FIG. 6 depicts steps performed in a particular order for purposes of illustration and discussion, the methods of the present disclosure are not limited to the particularly illustrated order or arrangement. The various steps of example method 600 can be omitted, rearranged, combined, and/or adapted in various ways without deviating from the scope of the present disclosure.

At 602, example method 600 can include obtaining an output of a machine-learned agent model. For instance, an agent model can include agent model 110. The output (e.g., output 112, 412), can be obtained in an online or offline context. The output can include a next state feature generated by the machine-learned agent model based on a sequence of preceding states. For instance, the next state feature can be or include an action feature 412. The next state feature can be generated based on an input that includes multiple prior state features, such as state features 404-1, 404-2, etc. The prior state features can include past inputs or outputs to or from agent model 110. In this manner, for instance, agent model 110 can conduct multi-turn reasoning paths. At each next state, agent model 110 can determine a step to take to service a user query associated with input 102.

For example, in some implementations of example method 600, the next state feature (e.g., action feature 412) can indicate an action to perform using a tool external to the machine-learned agent model. In some implementations of example method 600, a next state includes the next state feature and a result obtained by performing the action using the tool. In some implementations of example method 600, the next state can be added to the sequence of preceding states for future iterations.

For example, in some implementations of example method 600, the next state feature (e.g., action feature 412) can indicate an action to perform using agent model 110. The action can be, for example, a reasoning or "thought" action to generate analysis of one or more portions of the preceding state(s), such as to break down a complex query into simpler sub-queries, etc.

Each output for each step can thus be used for future processing iterations. For instance, output returns from various external tools or output returns from reasoning actions (e.g., using agent model 110 itself) can be packaged as an updated input (e.g., updated input 460) to be processed in future iterations.

In some implementations of example method 600, the machine-learned agent model can include a machine-learned sequence-to-sequence model configured for natural language processing.

At 604, example method 600 can include processing, using a machine-learned reward model, the output and the sequence of preceding states to generate a quality indicator that indicates a quality of the next state feature in view of the preceding states. In some implementations of example method 600, the machine-learned reward model was trained by, for a respective training input and one or more respective training outputs, retrieving reference data from a reference data source and computing one or more quality indicators in view of the respective training input, the one or more respective training outputs, and the reference data.

In some implementations of example method 600, the reward model (e.g., reward model 130) can access the reference data directly. In some implementations of example method 600, the reward model (e.g., reward model 130) can access the reference data indirectly (e.g., distilled into reward model 130 via a training process).

In some implementations of example method 600, the machine-learned reward model can include a machine-learned sequence-to-sequence model configured for natural language processing.

In some implementations of example method 600, the quality indicator can be a quality indicator 232 output by reward model 130. In some implementations of example method 600, the quality indicator can include a binary indicator. In some implementations of example method 600, the quality indicator can include a scalar value. In some implementations of example method 600, the quality indicator can include a scalar value based on a likelihood (e.g., a log likelihood) output by reward model 130 indicative of a goodness of the output (e.g., the output 112).

In some implementations of example method 600, example method 600 can include retrieving, from a reference data source, reference data associated with the preceding states. In some implementations of example method 600, example method 600 can include processing, using the machine-learned reward model, the output and the sequence of preceding states in view of the reference data to generate the quality indicator.

At 606, example method 600 can include outputting the quality indicator to a model trainer for updating the machine-learned agent model based on the quality indicator. In some implementations of example method 600, example method 600 can include training, using the model trainer, the machine-learned agent model based on the quality indicator (e.g., using a reinforcement learning technique). In some implementations of example method 600, training the machine-learned agent model can include updating one or more parameters of the machine-learned agent model to increase an expected reward. In some implementations of example method 600, training the machine-learned agent model can include updating one or more parameters of the machine-learned agent model to decrease an expected length of a sequence of states.

In some implementations of example method 600, example method 600 can include retrieving, from a reference data source, reference data associated with the preceding states. In some implementations of example method 600, example method 600 can include processing, using a machine-learned supervisor model, the output, the sequence of preceding states, and the reference data to generate a reference quality indicator. For instance, a supervisor model can include supervisor model 330. In some implementations of example method 600, the machine-learned supervisor model can include a machine-learned sequence-to-sequence model configured for natural language processing.

In some implementations of example method 600, example method 600 can include training the machine-learned reward model based on the reference quality indicator.

In some implementations of example method 600, the reference data can be obtained by retrieving content from a plurality of web resources and summarizing the content. For instance, content can be summarized by processing with a natural language processing model with an instruction to summarize. That natural language model can be the same as or different from supervisor model 330 or reward model 130. In some implementations of example method 600, the reference data can be composed by concatenating the summarized content (e.g., to be ingested by reward model 130 or supervisor model 330).

In some implementations of example method 600, example method 600 can include training a reward model using a supervisor model. In some implementations of example method 600, example method 600 can include obtaining a sampled plurality of outputs from the machine-learned agent model. In some implementations of example method 600, example method 600 can include processing, using the machine-learned reward model, each of the sampled plurality of outputs to generate a respective plurality of quality indicators. In some implementations of example method 600, example method 600 can include processing, using the machine-learned supervisor model, each of the sampled plurality of outputs in view of the reference data to indicate a preferred sampled output. In some implementations of example method 600, example method 600 can include training the machine-learned reward model to generate a more preferential quality signal for the preferred sampled output.

In some implementations of example method 600, the respective plurality of quality indicators can form a quality indicator logit. In some implementations of example method 600, the preferred sampled output can be indicated by a one-hot vector across the sampled of plurality of outputs. In some implementations of example method 600, example method 600 can include determining a cross-entropy loss between the quality indicator logit and the one-hot vector.

FIG. 7 depicts a flow chart diagram of an example method 700 to perform according to example embodiments of the present disclosure. Example method 700 can be implemented by one or more computing systems (e.g., one or more computing systems as discussed with respect to FIGS. 1A to 5C). Although FIG. 7 depicts steps performed in a particular order for purposes of illustration and discussion, the methods of the present disclosure are not limited to the particularly illustrated order or arrangement. The various steps of example method 700 can be omitted, rearranged, combined, and/or adapted in various ways without deviating from the scope of the present disclosure.

At 702, example method 700 can include obtaining one or more outputs of a machine-learned agent model. For instance, an agent model can include agent model 110. The output (e.g., output 112, 412), can be obtained in an online or offline context. The output can include a next state feature generated by the machine-learned agent model based on a sequence of preceding states. For instance, the next state feature can be or include an action feature 412. The next state feature can be generated based on an input that includes multiple prior state features, such as state features 404-1, 404-2, etc. The prior state features can include past inputs or outputs to or from agent model 110. In this manner, for instance, agent model 110 can conduct multi-turn reasoning paths. At each next state, agent model 110 can determine a step to take to service a user query associated with input 102.

For example, in some implementations of example method 700, the next state feature (e.g., action feature 412) can indicate an action to perform using a tool external to the machine-learned agent model. In some implementations of example method 700, a next state includes the next state feature and a result obtained by performing the action using the tool. In some implementations of example method 700, the next state can be added to the sequence of preceding states for future iterations.

For example, in some implementations of example method 700, the next state feature (e.g., action feature 412) can indicate an action to perform using agent model 110. The action can be, for example, a reasoning or "thought" action to generate analysis of one or more portions of the preceding state(s), such as to break down a complex query into simpler sub-queries, etc.

Each output for each step can thus be used for future processing iterations. For instance, output returns from various external tools or output returns from reasoning actions (e.g., using agent model 110 itself) can be packaged as an updated input (e.g., updated input 460) to be processed in future iterations.

In some implementations of example method 700, the machine-learned agent model can include a machine-learned sequence-to-sequence model configured for natural language processing.

At 704, example method 700 can include processing, using a machine-learned reward model, the respective output and the sequence of preceding states to generate a quality indicator that indicates a quality of the next state feature in view of the preceding states.

In some implementations of example method 700, the machine-learned reward model was trained by, for a respective training input and one or more respective training outputs, retrieving reference data from a reference data source and computing one or more quality indicators in view of the respective training input, the one or more respective training outputs, and the reference data.

In some implementations of example method 700, the reward model (e.g., reward model 130) can access the reference data directly. In some implementations of example method 700, the reward model (e.g., reward model 130) can access the reference data indirectly (e.g., distilled into reward model 130 via a training process).

In some implementations of example method 700, the machine-learned reward model can include a machine-learned sequence-to-sequence model configured for natural language processing.

In some implementations of example method 700, the quality indicator can be a quality indicator 232 output by reward model 130. In some implementations of example method 700, the quality indicator can include a binary indicator. In some implementations of example method 700, the quality indicator can include a scalar value. In some implementations of example method 700, the quality indicator can include a scalar value based on a likelihood (e.g., a log likelihood) output by reward model 130 indicative of a goodness of the output (e.g., the output 112).

In some implementations of example method 700, example method 700 can include retrieving, from a reference data source, reference data associated with the preceding states. In some implementations of example method 700, example method 700 can include processing, using the machine-learned reward model, the output and the sequence of preceding states in view of the reference data to generate the quality indicator.

At 706, example method 700 can include retrieving, from a reference data source, reference data associated with the preceding states. In some implementations of example method 700, the reference data can be obtained by retrieving content from a plurality of web resources and summarizing the content. For instance, content can be summarized by processing with a natural language processing model with an instruction to summarize. That natural language model can be the same as or different from supervisor model 330 or reward model 130. In some implementations of example method 700, the reference data can be composed by concatenating the summarized content (e.g., to be ingested by reward model 130 or supervisor model 330).

At 708, example method 700 can include processing, using a machine-learned supervisor model, the respective output, the sequence of preceding states, and the reference data to generate a reference quality indicator. In some implementations of example method 700, the machine-learned supervisor model can include a machine-learned sequence-to-sequence model configured for natural language processing. For instance, a supervisor model can include supervisor model 330.

At 710, example method 700 can include training the machine-learned reward model based on the reference quality indicator. In some implementations of example method 700, example method 700 can include obtaining a sampled plurality of outputs from the machine-learned agent model. In some implementations of example method 700, example method 700 can include processing, using the machine-learned reward model, each of the sampled plurality of outputs to generate a respective plurality of quality indicators. In some implementations of example method 700, example method 700 can include processing, using the machine-learned supervisor model, each of the sampled plurality of outputs in view of the reference data to indicate a preferred sampled output. In some implementations of example method 700, example method 700 can include training the machine-learned reward model to generate a more preferential quality signal for the preferred sampled output.

In some implementations of example method 700, the respective plurality of quality indicators can form a quality indicator logit. In some implementations of example method 700, the preferred sampled output can be indicated by a one-hot vector across the sampled of plurality of outputs. In some implementations of example method 700, example method 700 can include determining a cross-entropy loss between the quality indicator logit and the one-hot vector.

In some implementations of example method 700, example method 700 can include outputting the quality indicator to a model trainer for updating the machine-learned agent model based on the quality indicator. In some implementations of example method 700, example method 700 can include training, using the model trainer, the machine-learned agent model based on the quality indicator (e.g., using a reinforcement learning technique). In some implementations of example method 700, training the machine-learned agent model can include updating one or more parameters of the machine-learned agent model to increase an expected reward. In some implementations of example method 700, training the machine-learned agent model can include updating one or more parameters of the machine-learned agent model to decrease an expected length of a sequence of states.

FIG. 8 depicts a flow chart diagram of an example method 800 to perform according to example embodiments of the present disclosure. Example method 800 can be implemented by one or more computing systems (e.g., one or more computing systems as discussed with respect to FIGS. 1A to 5C). Although FIG. 8 depicts steps performed in a particular order for purposes of illustration and discussion, the methods of the present disclosure are not limited to the particularly illustrated order or arrangement. The various steps of example method 800 can be omitted, rearranged, combined, and/or adapted in various ways without deviating from the scope of the present disclosure.

At 802, example method 800 can include obtaining a user query. A user query can include a request for information or action from a computing system. For instance, a user query can be obtained from a user interface on a local or remote device. A user query can be obtained on a server computing system via an API exposed to an endpoint device operating a user interface (e.g., a web-based or native user interface).

At 804, example method 800 can include determining an initial state that comprises the user query. For instance, a user query can be processed (e.g., tokenized) into features that can form an initial state of a processing sequence (e.g., features 404-1, 404-2, etc.).

At 806, example method 800 can include processing, using a machine-learned agent model, the initial state to generate an output indicating action to perform for servicing the user query. For instance, an agent model can include agent model 110. The output (e.g., output 112, 412), can be obtained in an online or offline context. The output can include a next state feature generated by the machine-learned agent model based on a sequence of preceding states. For instance, the next state feature can be or include an action feature 412. The next state feature can be generated based on an input that includes multiple prior state features, such as state features 404-1, 404-2, etc. The prior state features can include past inputs or outputs to or from agent model 110. In this manner, for instance, agent model 110 can conduct multi-turn reasoning paths. At each next state, agent model 110 can determine a step to take to service a user query associated with input 102.

For example, in some implementations of example method 800, the next state feature (e.g., action feature 412) can indicate an action to perform using a tool external to the machine-learned agent model. In some implementations of example method 800, a next state includes the next state feature and a result obtained by performing the action using the tool. In some implementations of example method 800, the next state can be added to the sequence of preceding states for future iterations.

For example, in some implementations of example method 800, the next state feature (e.g., action feature 412) can indicate an action to perform using agent model 110. The action can be, for example, a reasoning or "thought" action to generate analysis of one or more portions of the preceding state(s), such as to break down a complex query into simpler sub-queries, etc.

Each output for each step can thus be used for future processing iterations. For instance, output returns from various external tools or output returns from reasoning actions (e.g., using agent model 110 itself) can be packaged as an updated input (e.g., updated input 460) to be processed in future iterations.

In some implementations of example method 800, the machine-learned agent model can include a machine-learned sequence-to-sequence model configured for natural language processing.

At 808, example method 800 can include obtaining a quality indicator that indicates a quality of the next state feature in view of the preceding states, the quality indicator generated using a machine-learned reward model based on the output and the sequence of preceding states. In some implementations of example method 800, example method 800 can include processing, using a machine-learned reward model, the respective output and the sequence of preceding states to generate a quality indicator that indicates a quality of the next state feature in view of the preceding states. In some implementations of example method 800, the machine-learned reward model was trained by, for a respective training input and one or more respective training outputs, retrieving reference data from a reference data source and computing one or more quality indicators in view of the respective training input, the one or more respective training outputs, and the reference data.

In some implementations of example method 800, the reward model (e.g., reward model 130) can access the reference data directly. In some implementations of example method 800, the reward model (e.g., reward model 130) can access the reference data indirectly (e.g., distilled into reward model 130 via a training process).

In some implementations of example method 800, the machine-learned reward model can include a machine-learned sequence-to-sequence model configured for natural language processing.

In some implementations of example method 800, the quality indicator can be a quality indicator 232 output by reward model 130. In some implementations of example method 800, the quality indicator can include a binary indicator. In some implementations of example method 800, the quality indicator can include a scalar value. In some implementations of example method 800, the quality indicator can include a scalar value based on a likelihood (e.g., a log likelihood) output by reward model 130 indicative of a goodness of the output (e.g., the output 112).

In some implementations of example method 800, example method 800 can include retrieving, from a reference data source, reference data associated with the preceding states. In some implementations of example method 800, example method 800 can include processing, using the machine-learned reward model, the output and the sequence of preceding states in view of the reference data to generate the quality indicator.

At 810, example method 800 can include training the machine-learned agent model based on the quality indicator.

In some implementations of example method 800, example method 800 can include training, using the model trainer, the machine-learned agent model based on the quality indicator (e.g., using a reinforcement learning technique). In some implementations of example method 800, training the machine-learned agent model can include updating one or more parameters of the machine-learned agent model to increase an expected reward. In some implementations of example method 800, training the machine-learned agent model can include updating one or more parameters of the machine-learned agent model to decrease an expected length of a sequence of states.

In some implementations of example method 800, example method 800 can include retrieving, from a reference data source, reference data associated with the preceding states. In some implementations of example method 800, example method 800 can include processing, using a machine-learned supervisor model, the output, the sequence of preceding states, and the reference data to generate a reference quality indicator. For instance, a supervisor model can include supervisor model 330. In some implementations of example method 800, the machine-learned supervisor model can include a machine-learned sequence-to-sequence model configured for natural language processing.

In some implementations of example method 800, example method 800 can include training the machine-learned reward model based on the reference quality indicator.

In some implementations of example method 800, the reference data can be obtained by retrieving content from a plurality of web resources and summarizing the content. For instance, content can be summarized by processing with a natural language processing model with an instruction to summarize. That natural language model can be the same as or different from supervisor model 330 or reward model 130. In some implementations of example method 800, the reference data can be composed by concatenating the summarized content (e.g., to be ingested by reward model 130 or supervisor model 330).

In some implementations of example method 800, example method 800 can include training a reward model using a supervisor model. In some implementations of example method 800, example method 800 can include obtaining a sampled plurality of outputs from the machine-learned agent model. In some implementations of example method 800, example method 800 can include processing, using the machine-learned reward model, each of the sampled plurality of outputs to generate a respective plurality of quality indicators. In some implementations of example method 800, example method 800 can include processing, using the machine-learned supervisor model, each of the sampled plurality of outputs in view of the reference data to indicate a preferred sampled output. In some implementations of example method 800, example method 800 can include training the machine-learned reward model to generate a more preferential quality signal for the preferred sampled output.

In some implementations of example method 800, the respective plurality of quality indicators can form a quality indicator logit. In some implementations of example method 800, the preferred sampled output can be indicated by a one-hot vector across the sampled of plurality of outputs. In some implementations of example method 800, example method 800 can include determining a cross-entropy loss between the quality indicator logit and the one-hot vector.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

Aspects of the disclosure have been described in terms of illustrative embodiments thereof. Any and all features in the following claims can be combined or rearranged in any way possible, including combinations of claims not explicitly enumerated in combination together, as the example claim dependencies listed herein should not be read as limiting the scope of possible combinations of features disclosed herein. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Clauses and other sequences of items joined by a particular conjunction such as "or," for example, can refer to "and/or," "at least one of", "any combination of" example elements listed therein, etc. Also, terms such as "based on" should be understood as "based at least in part on."

What is claimed is:

1. A computer-implemented method for generating feedback signals for training a machine-learned agent model, the method comprising:

obtaining, by a computing system comprising one or more processors, an output of a machine-learned agent model, wherein the output comprises a next state feature generated by the machine-learned agent model based on a sequence of preceding states;

processing, by the computing system and using a machine-learned reward model, the output and the sequence of preceding states to generate a quality indicator that indicates a quality of the next state feature in view of the preceding states, wherein the machine-learned reward model was trained by:

obtaining a sampled plurality of outputs;

processing, using the machine-learned reward model, each of the sampled plurality of outputs to generate a plurality of quality indicators;

processing, using a machine-learned supervisor model, each of the sampled plurality of outputs in view of reference data retrieved from a reference data source to indicate a preferred sampled output; and training the machine-learned reward model to generate a more preferential quality signal for the preferred sampled output; and outputting, by the computing system, the quality indicator to a model trainer for updating the machine-learned agent model based on the quality indicator.

2. The computer-implemented method of claim 1, wherein the quality indicator comprises a binary indicator.

3. The computer-implemented method of claim 1, wherein:

the next state feature indicates an action to perform using a tool external to the machine-learned agent model;

a next state comprises the next state feature and a result obtained by performing the action using the tool; and the next state is added to the sequence of preceding states for future iterations.

4. The computer-implemented method of claim 1, comprising:

retrieving, by the computing system and from a reference data source, reference data associated with the preceding states; and processing, by the computing system and using the machine-learned reward model, the output and the sequence of preceding states in view of the reference data to generate the quality indicator.

5. The computer-implemented method of claim 1, comprising:

retrieving, by the computing system and from a reference data source, reference data associated with the preceding states;

processing, by the computing system and using the machine-learned supervisor model, the output, the sequence of preceding states, and the reference data to generate a reference quality indicator that indicates the preferred sampled output; and training, by the computing system, the machine-learned reward model based on the reference quality indicator.

6. The computer-implemented method of claim 5, wherein the reference data is obtained by:

retrieving, by the computing system, content from a plurality of web resources;

summarizing, by the computing system, the content; and composing, by the computing system, the reference data by concatenating the summarized content.

7. The computer-implemented method of claim 5, comprising:

obtaining, by the computing system, the sampled plurality of outputs from the machine-learned agent model.

8. The computer-implemented method of claim 7, wherein:

the plurality of quality indicators form a quality indicator logit;

the preferred sampled output is indicated by a one-hot vector across the sampled of plurality of outputs; and the method comprises:

determining, by the computing system, a cross-entropy loss between the quality indicator logit and the one-hot vector.

9. The computer-implemented method of claim 1, comprising: training, by the computing system and using the model trainer, the machine-learned agent model based on the quality indicator.

10. The computer-implemented method of claim 9, wherein training the machine-learned agent model comprises:

updating, by the computing system, one or more parameters of the machine-learned agent model to increase an expected reward.

11. The computer-implemented method of claim 9, wherein training the machine-learned agent model comprises:

updating, by the computing system, one or more parameters of the machine-learned agent model to decrease an expected length of a sequence of states.

12. The computer-implemented method of claim 1, wherein the machine-learned agent model comprises a machine-learned sequence-to-sequence model configured for natural language processing.

13. The computer-implemented method of claim 12, wherein the machine-learned reward model comprises a machine-learned sequence-to-sequence model configured for natural language processing.

14. The computer-implemented method of claim 5, wherein the machine-learned supervisor model comprises a machine-learned sequence-to-sequence model configured for natural language processing.

15. A computing system, comprising:

one or more processors; and one or more non-transitory computer-readable media storing instructions that are executable by the one or more processors to cause the computing system to perform operations, the operations comprising:

obtaining an output of a machine-learned agent model, wherein the output comprises a next state feature generated by the machine-learned agent model based on a sequence of preceding states;

processing, using a machine-learned reward model, the output and the sequence of preceding states to generate a quality indicator that indicates a quality of the next state feature in view of the preceding states, wherein the machine-learned reward model was trained by:

obtaining a sampled plurality of outputs;

processing, using the machine-learned reward model, each of the sampled plurality of outputs to generate a plurality of quality indicators;

processing, using a machine-learned supervisor model, each of the sampled plurality of outputs in view of reference data retrieved from a reference data source to indicate a preferred sampled output; and training the machine-learned reward model to generate a more preferential quality signal for the preferred sampled output; and outputting the quality indicator to a model trainer for updating the machine-learned agent model based on the quality indicator.

16. The computing system of claim 15, the operations comprising:

retrieving, from a reference data source, reference data associated with the preceding states;

processing, using the machine-learned supervisor model, the output, the sequence of preceding states, and the reference data to generate a reference quality indicator that indicates the preferred sampled output; and training the machine-learned reward model based on the reference quality indicator.

17. The computing system of claim 15, wherein the reference data is obtained by:

retrieving content from a plurality of web resources;

summarizing the content; and composing the reference data by concatenating the summarized content.

18. The computing system of claim 16, the operations comprising:

obtaining the sampled plurality of outputs from the machine-learned agent model.

19. The computing system of claim 18, wherein:

the plurality of quality indicators form a quality indicator logit;

the preferred sampled output is indicated by a one-hot vector across the sampled of plurality of outputs; and the operations comprise:

determining a cross-entropy loss between the quality indicator logit and the one-hot vector.

20. One or more non-transitory computer-readable media storing instructions that are executable by one or more processors to cause a computing system to perform operations, the operations comprising:

obtaining an output of a machine-learned agent model, wherein the output comprises a next state feature generated by the machine-learned agent model based on a sequence of preceding states;

processing, using a machine-learned reward model, the output and the sequence of preceding states to generate a quality indicator that indicates a quality of the next state feature in view of the preceding states, wherein the machine-learned reward model was trained by:

obtaining a sampled plurality of outputs;

processing, using the machine-learned reward model, each of the sampled plurality of outputs to generate a plurality of quality indicators;

processing, using a machine-learned supervisor model, each of the sampled plurality of outputs in view of reference data retrieved from a reference data source to indicate a preferred sampled output; and training the machine-learned reward model to generate a more preferential quality signal for the preferred sampled output; and outputting the quality indicator to a model trainer for updating the machine-learned agent model based on the quality indicator.

\* \* \* \* \*